United States Patent [19]

Kaufman

[11] 3,949,099

[45] Apr. 6, 1976

[54] METHOD FOR PASTEURIZING A LIQUID

[75] Inventor: Vern F. Kaufman, Lafayette, Calif.

[73] Assignee: The United States of America as represented by the Secretary of Agriculture, Washington, D.C.

[22] Filed: June 11, 1974

[21] Appl. No.: 478,416

Related U.S. Application Data

[62] Division of Ser. No. 302,620, Oct. 31, 1972, Pat. No. 3,830,149.

[52] U.S. Cl. ................ 426/521; 426/476; 426/511; 426/522
[51] Int. Cl.² ............................................ A23L 3/16
[58] Field of Search .......... 426/521, 522, 356, 348, 426/349, 511; 99/452, 453; 426/476

[56] References Cited
UNITED STATES PATENTS

| | | | |
|---|---|---|---|
| 902,812 | 11/1908 | Goetz et al. ........................ | 426/521 |
| 1,798,120 | 3/1931 | Grindrod ......................... | 426/511 X |
| 2,901,225 | 8/1959 | Abrams........................... | 426/521 X |
| 3,404,008 | 10/1968 | Ballas et al. ..................... | 426/521 X |
| R19,193 | 6/1934 | Grindrod ......................... | 426/356 X |

*Primary Examiner*—S. Leon Bashore
*Assistant Examiner*—Arthur L. Corbin
*Attorney, Agent, or Firm*—M. Howard Silverstein; William Takacs; Max D. Hensley

[57] ABSTRACT

Liquid is heated to a pasteurization temperature, pumped into a holding zone wherein the liquid is divided into a plurality of slugs and the slugs are then impelled through the holding zone by mechanical action, such as piston action, applied to each individual slug.

2 Claims, 5 Drawing Figures

METHOD FOR PASTEURIZING A LIQUID

A non-exclusive, irrevocable, royalty-free license in the invention herein described, throughout the world for all purposes of the United States Government, with the power to grant sublicenses for such purposes, is hereby granted to the Government of the United States of America.

This is a division of my copending application Ser. No. 302,620 filed Oct. 31, 1972, now U.S. Pat. No. 3,830,149.

DESCRIPTION OF THE INVENTION

This invention relates to and has among its objects the provision of novel method and apparatus for pasteurizing liquids, e.g., egg whites, yolks, salt yolks, whole egg, etc. Further objects of the invention will be evident from the following description and the annexed drawing.

Figure 1:
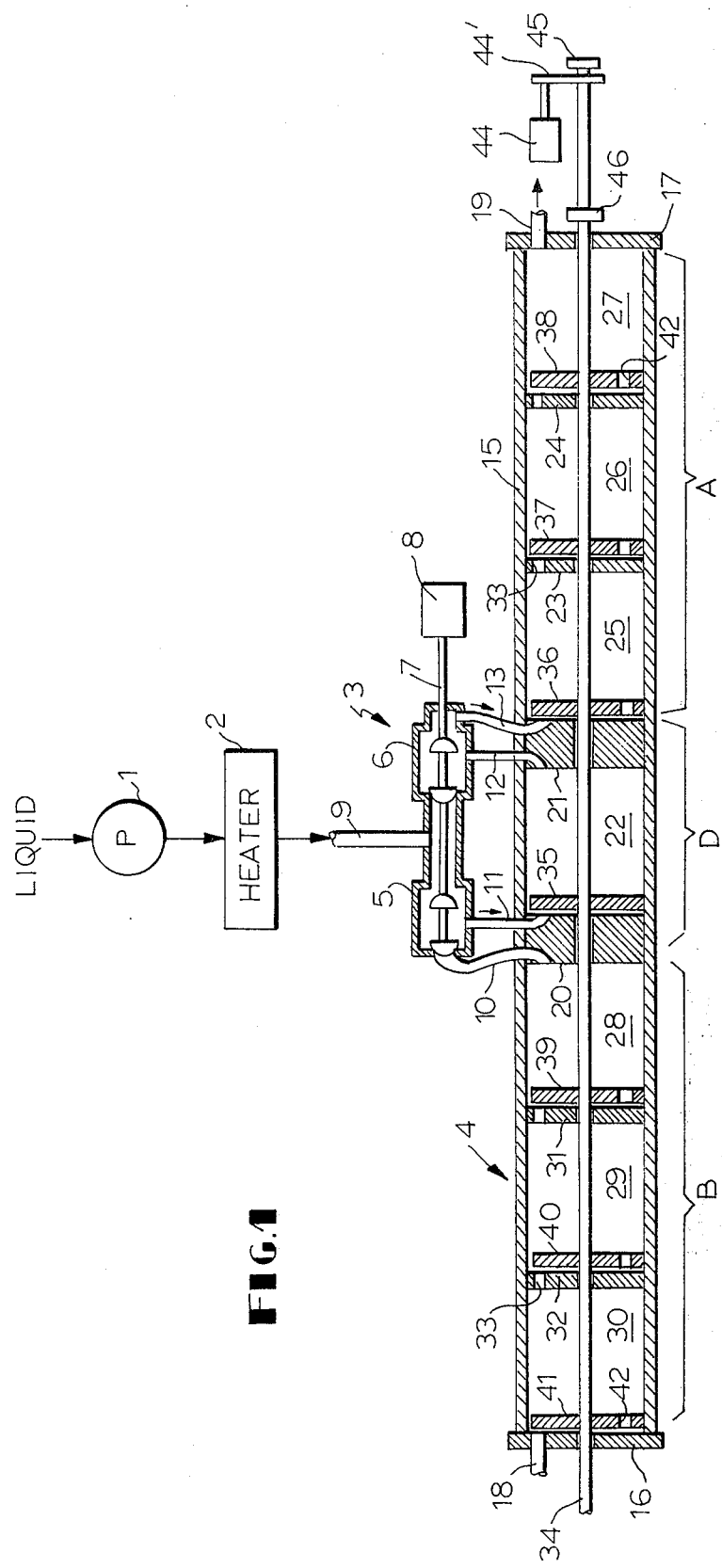
FIG. 1 is a schematic diagram of the apparatus of the invention. In this instance rod 34 and the associated pistons are shown in position for start of a stroke to the right.

In the following description, application of the invention to egg liquids is emphasized. This is by way of illustration and not limitation. In its broad ambit this invention is applicable to liquid foods in general. Thus in addition to egg liquids, the invention can be utilized for the pasteurization of various liquid food products as, for example, whole milk, cream, skim milk, egg-milk compositions, beer, wine, fruit and vegetable juices, sauces, gravies, beverages, syrups, and the like. In addition to pasteurization, the invention may be applied wherever a need exists for uniform retention of a liquid undergoing processing such as sterilization, cooking, or chemical reaction.

Commercial pasteurization of egg liquids involvles a treatment where the egg liquid is heated and then while hot held for a period of time such that pathogenic organisms and other undesirable bacteria are destroyed but chemical composition and physical properties are essentially unaltered. In conventional operations the liquid is passed through a heat exchanger to increase its temperature. The required holding time is then achieved by flowing the hot liquid through a holding coil which consists of a series of straight lengths of tubing connected by returned bends. Although this procedure is widely used, it involves several disadvantages.

One problem is that of non-uniform holding times in different portions of the liquid under treatment. Because of their relatively high viscosity, the flow of egg liquids through the holding tubes is largely laminar. In laminar flow the liquid that flows in the center of the tubes has the highest velocity and will go through the holding tube in about half the time for the average. On the other hand, the liquid next to the wall has zero velocity. There is a continuous velocity change across the entire section of the tubing so there is a wide range of holding times being experienced by different portions of the liquid, depending on their position in the stream. As a result, the product will contain portions that have been inadequately pasteurized and other portions that are over-treated so that functional properties are impaired.

Concomitantly with different flow rates, the temperature of a cross-section of the egg material within the tube is not uniform, thus further limiting the effectiveness of pasteurization.

Another disadvantage is that build-up of product either as a foam or as a solid may occur in the holding tube. This decreases the effective holding time and the efficiency of pasteurization. In one instance, a holding tube running salt yolk was found to have so much foam in it that the ratio of minimum retention time to the anticipated average holding time was less than 40%. A build-up of a coagulated foam product has been observed in a holding tube running egg whites. The material was ½ to 1 inch thick along the top of a 3-inch diameter tube.

In operating any pasteurization system it is necessary at times to replace the liquid in the holding tube by another liquid. For instance, in starting up the system the tube is first filled with water which is then replaced with the liquid to be pasteurized. At shut-down the egg liquid in the system is removed by replacement with water. With conventional holding tubes these replacements entail considerable mixing of egg liquid with water, resulting in substantial losses of valuable material. This is particularly true when the system is shut down. When water is pumped through the unit to displace the egg liquid, the water flows mostly through the centers of the channels, leaving much of the egg material behind. It has been estimated that with a system operating on salt yolk, over half the material contained in the system will become mixed with water and therefore unfit for sale. Considering that a typical holding tube will have a capacity of about 350 lbs. of egg material worth about 50cents per lb., the significance of the loss is obvious. It may also be observed that the disposal of diluted egg materials involves further problems from the standpoint of pollution of water courses.

The object of the invention is the provision of method and apparatus wherein the foregoing problems are obviated. A primary feature of the invention is tht laminar flow with its attendant problems is avoided. In accordance with the invention, the liquid is divided into slugs, and these slugs are conveyed by positive action through a holding zone at a predetermined rate. The system is constructed and arranged so that the material within each slug is thoroughly mixed, whereas there is minimum mixing between adjacent slugs. As a result, each particle of material is held for the same period of time and at the same temperature. Build-up of foam and solid deposits is prevented. Replacement with water or other liquid is accomplished readily with little intermixing of the liquid in the system.

The manner in which these and similar advantages are secured is next described in detail, having reference to the annexed drawing.

Referring to FIG. 1, the liquid to be pasteurized is directed by pump 1 to heat exchanger 2 wherein it is brought to the appropriate pasteurization temperature. The continuous action of pump 1 forces the hot liquid through the valve system, generally designated as 3, and into the holding unit, generally designated as 4. The hot liquid is retained within holding unit 4 for the predetermined time required to effectuate the pasteurization. The pasteurized product is discharged alternately from outlets 18 and 19.

The valve system generally designated as 3 includes two three-way valves 5 and 6, actuator rod 7, and actuator 8. Valves 5 and 6 have a common inlet 9. Ducts 10, 11, 12, and 13 are provided for directing liquid to or from holding unit 4.

Actuator 8 operates to slide rod 7 into either of two positions. In the position shown in FIG. 1, there is communication between inlet 9 and duct 11. Also, liquid can flow between ducts 12 and 13. On the other hand, when actuator 8 moves rod 7 to the right, there is communication between inlet 9 and duct 12. Liquid can also flow between ducts 10 and 11. See FIG. 2.

Actuator 8 may be operated electrically or by fluid pressure. It may be noted that no novelty is claimed per se for valve system 3. Devices of this kind are available on the market.

Figure 5:
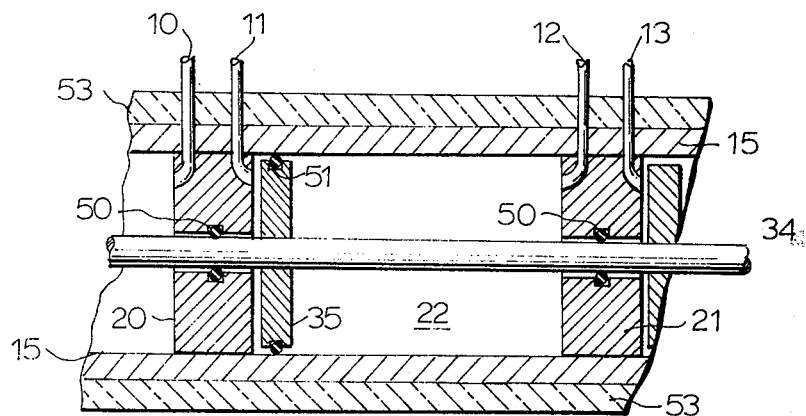

The holding unit generally designated as 4 includes a cylindrical sleeve 15 and end plates 16 and 17, the latter being equipped with outlets 18 and 19, respectively. Ordinarily, unit 4 need not be provided with thermal insulation because pasteurization involves a relatively low temperature gradient of about 70°–75° F. above the ambient, and a holding time of a matter of minutes. If desired, however, unit 4 may be covered with conventional thermal insulation 53, as illustrated in FIG. 5.

Elements hereinafter described are provided to divide sleeve 15 into a driving section D, and two similar holding sections A and B.

Fixed within sleeve 15 are center plates 20 and 21, forming drive cylinder 22 therebetween. Also fixed within sleeve 15 are separators 23 and 24, forming cylinders 25, 26, and 27 of holding section A. In similar manner holding section B is made up of cylinders 28, 29, and 30 provided by separators 31 and 32 fixed within sleeve 15. Each of the aforesaid seperators 23, 24, 31, and 32 is provided with a small bore 33. Bores 33 generally have a cross-sectional area about 1/120 that of sleeve 15.

Slideably mounted within sleeve 15 is a drive rod 34 on which is keyed a series of pistons 35, 36, 37, 38, 39, 40, and 41. Drive piston 35 is equipped with an O-ring seal 51 (note FIG. 5) to prevent leakage of liquid. In the case of the other pistons (36–41) no sealing means is needed, although such can be provided if desired. Also, each of the latter is equipped with a small bore 42, of the same size as bores 33 in separators 23, 24, 31, and 32.

Since all of the pistons 35–41 are keyed on rod 34, it is evident that they move together to left or right as dictated by fluid pressure on either side of drive piston 35.

As FIG. 1 is drawn, the holding unit consists of six holding cylinders—three each in sections A and B. It is within the compass of the invention to employ a greater or lesser number of cylinders. This aspect of the invention can be realized by changing the number of separators and pistons. The holding capacity may also be varied by changing the lengths of the cylinders or the diameter of sleeve 15.

In operation, the movement of drive rod 34 controls the position of valves 5 and 6. Thus there is provided a switch 44 which is operatively connected to valve actuator 8. See FIG. 3. Switch 44, in turn, is operated by detents 45 and 46 on drive rod 34. Thus when rod 34 reaches the end of its travel in a left-hand direction, detent 45 contacts arm 44' of switch 44, whereby actuator 8 moves valve rod 7 to the position shown in FIG. 1. When drive rod 34 reaches the end of its right-hand travel, detent 46 contracts arm 44' of switch 44 and valve rod 7 is moved to the position shown in FIG. 2.

The operation of the holding unit is now described, having reference to FIG. 1. Hot liquid is forced by pump 1 through inlet 9, valve 5, and duct 11 into cylinder 22. Since the liquid enters to the left of drive piston 35, the latter is pushed to the right. Also, since all the pistons are mounted on rod 34, all of them are forced to the right with the movement of drive piston 35. This movement has the following concomitant effects on the liquid slugs already contained in cylinders 22, 25, 26, and 27. The liquid in cylinder 22 to the right of piston 35 is forced through duct 12, valve 6, and duct 13 into cylinder 25, occupying the space to the left of piston 36. Liquid in cylinder 25 to the right of piston 36 is forced through bore 33 in separator 23, then into cylinder 26 where it occupies the space to the left of piston 37. Similarly, liquid in cylinder 26 to the right of piston 37 is forced into cylinder 27 where it occupies the space to the left of piston 38. Liquid in cylinder 27 to the right of piston 38 is forced out of the system via outlet 19. It should be noted that in this cycle, none of the liquid flows through bores 42 in pistons 36, 37, or 38 because the pistons move at a rate that creates volume behind them equal to the volume of liquid coming through the preceding separators.

In sum, the slugs of liquid which had occupied cylinders 22, 25, and 26 are each moved to the right to the next adjacent cylinder, and the slug which had occupied the last cylinder 27 is forced out of the system.

During this cycle there is no outflow of material from section B of the holding unit because duct 10 is closed by the particular position of valve 5. What does occur in each cylinder is a movement of liquid from the right to the left side of the piston therein. For example, the liquid in cylinder 28 moves through bore 42 in piston 39 so that it remains in the same cylinder but on the left side of piston 39. An equivalent action occurs in cylinders 29 and 30. During this action, the liquid in each slug is effectively mixed, but there is a minimum of mixing between adjacent slugs.

Figure 2:
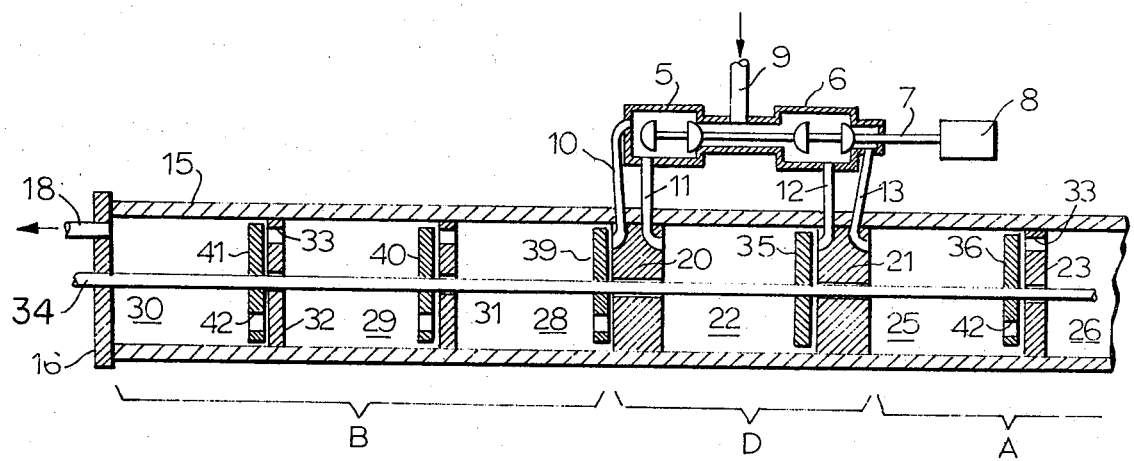
FIG. 2 is a schematic diagram of a portion of the same apparatus as in FIG. 1, except that in this case rod 34 and the associated pistons are shown in position for start of a stroke to the left.

This cycle is over when cylinder 22 is filled with incoming liquid from heat exchanger 2. When this occurs, detent 46 strikes arm 44' of switch 44 which causes actuator 8 to draw valve rod 7 to the right, the new position being as shown in FIG. 2.

The action which takes place in the next cycle is as follows, having reference to FIG. 2.

Hot liquid is forced by pump 1 through inlet 9, valve 6, and duct 12 into cylinder 22. Since the liquid enters to the right of drive piston 35, the latter is pushed to the left. Rod 34 and all the pistons mounted thereon also move to the left. This movement has the following concomitant effects on the liquid slugs already contained in cylinders 22, 28, 29, and 30. The liquid in cylinder 22 to the left of piston 35 is forced through duct 11, valve 5, and duct 10 into cylinder 28 wherein it occupies the space to the right of piston 39. Liquid in cylinder 28 to the left of piston 39 is forced through bore 33 in separator 31, then into cylinder 29 where it occupies the space to the right of piston 40. Liquid in cylinder 29 to the left of piston 40 is forced through bore 33 in separator 32, then into cylinder 30 where it occupies the space to the right of piston 41. Liquid in cylinder 30 to the left of piston 41 is forced out of the system via outlet 18.

In sum, the slugs of liquid which had occupied cylinders 22, 28, and 29 are each moved to the left to the next adjacent cylinder, and the slug which had occupied the last cylinder 30 is ejected out of the system.

During this cycle there is no outflow of material from section A of the holding unit because duct 13 is closed by the particular position of valve 6. The action that does occur in each cylinder is a movement of liquid from the left to the right side of the piston therein. For example, the liquid in cylinder 25 moves through bore 42 in piston 36 so that it remains in the same cylinder but on the right side of piston 36. An equivalent action occurs in cylinders 26 and 27.

This cycle is over when cylinder 22 is filled with incoming liquid from heat exchanger 2. When this occurs, detent 45 strikes arm 44' of switch 44 which causes actuator 8 to draw valve rod 7 to the left, the new position being as shown in FIG. 1. The first-described cycle then starts.

It is evident from the foregoing description that the cycles continue alternately as long as material is pumped into the system, and that the rate at which the cycles are accomplished—hence the sojourn of liquid in the holding unit—is dependent on the rate at which the material enters the system.

Figure 3:
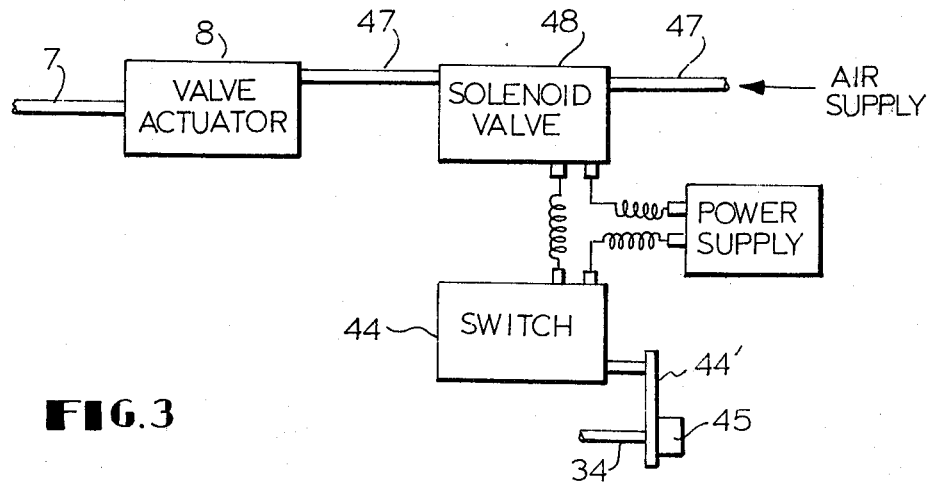
FIG. 3 is a diagram illustrating the arrangement of the valve actuator and controls.

FIG. 3 illustrates the interconnection between valve actuator 8 and switch 44. As illustrated, actuator 8 is operated by air pressure which is supplied by pipe 47 and is controlled by solenoid valve 48. For example, actuator 8 may be spring-biased to normally move valve rod 7 to the position shown in FIG. 1.

When, however, detent 46 strikes switch arm 44', solenoid valve 48 is activated so that air flows to actuator 8 and rod 7 is drawn to the position shown in FIG. 2, where it remains until the original position is restored when detent 45 strikes switch arm 44'.

Figure 4:
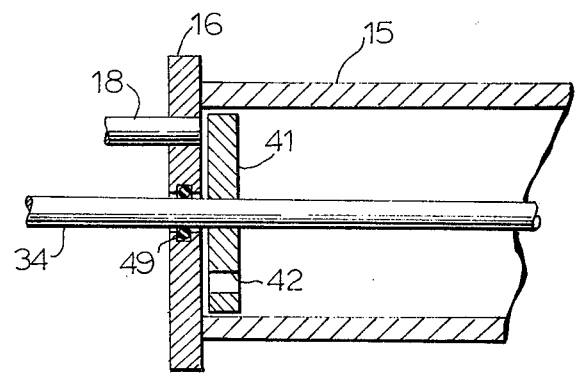
FIGS. 4 and 5 are diagrams, on an enlarged scale, illustrating details of the holding unit of the invention.

FIG. 4 illustrates the left-hand portion of holding unit 4 and shows O-ring 49 provided to seal the space between rod 34 and end plate 16.

FIG. 5 illustrates the center portion of holding unit 4. O-rings 50 are provided to seal the space between center plates 20, 21 and rod 34. To prevent leakage of liquid past drive piston 35, there is provided O-ring 51. FIG. 5 also illustrates the optional covering of the holding unit with thermal insulation 53.

Some of the advantages of the invention are outlined as follows:

The flow of liquid into the holding unit controls the operation of this unit. Accordingly, holding time can be varied simply by changing this flow rate.

The invention has the advantage that no forward mixing occurs between slugs. This means that none of the liquid will have been exposed to a shorter holding time than the remainder, and the effectiveness of the pasteurization is thus ensured.

The unique design of the piston system obviates any build-up of product because of the positive sweeping action of each piston. This means that uniform holding time is assured, and cleaning of the system is simpler.

Another advantage of the invention is that the cross-sectional temperature in any given slug is uniform. This results because of the mixing that occurs within individual slugs as they are forced through the valves connected with drive cylinder 22 and the bores 42 and 33 in the pistons and separators, respectively.

A further advantage of the invention can be explained as follows: In conventional pasteurization equipment, undesirable mixing occurs when the material under treatment is changed from one liquid to another. In addition, after the equipment has been cleaned with water, residual water mixes with the newly-introduced product. However, since no forward inter-slug mixing and only slight backward inter-slug mixing takes place in the device of the invention, undesirable mixing between non-compatible materials is confined to a limited number of slugs.

I claim:

1. A method for pasteurizing a liquid, which comprises - heating the liquid to a pasteurization temperature, pumping the hot liquid into a holding zone, within the holding zone dividing the liquid into a plurality of individual slugs, and positively impelling the slugs through the holding zone at a rate sufficient to achieve desired pasteurization by mechanical action applied to each individual slug.

2. A method for pasteurizing a liquid, which comprises - heating the liquid to a pasteurization temperature, pumping the hot liquid into a holding zone equipped with a plurality of pistons, within the holding zone dividing the liquid into a plurality of individual slugs, and positively impelling the slugs through the holding zone at a rate sufficient to achieve desired pasteurization by piston action applied to each individual slug.

* * * * *